(12) United States Patent
Brickell

(10) Patent No.: US 7,444,512 B2
(45) Date of Patent: Oct. 28, 2008

(54) ESTABLISHING TRUST WITHOUT REVEALING IDENTITY

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/412,366

(22) Filed: Apr. 11, 2003

(65) Prior Publication Data

US 2004/0205341 A1  Oct. 14, 2004

(51) Int. Cl.
*H04L 9/00* (2006.01)
(52) U.S. Cl. ...................... 713/168; 380/286
(58) Field of Classification Search ................ 713/168; 380/286
See application file for complete search history.

(56) References Cited

U.S. PATENT DOCUMENTS

| | | | | |
|---|---|---|---|---|
| 5,953,422 | A | * | 9/1999 | Angelo et al. ............... 713/185 |
| 6,473,508 | B1 | | 10/2002 | Young et al. |
| 2002/0004900 | A1 | * | 1/2002 | Patel .......................... 713/155 |
| 2003/0037089 | A1 | | 2/2003 | Cota-Robles et al. |
| 2003/0093687 | A1 | * | 5/2003 | Westhoff et al. ............. 713/200 |
| 2003/0235175 | A1 | * | 12/2003 | Naghian et al. ............. 370/338 |

FOREIGN PATENT DOCUMENTS

| FR | 2620248 | 3/1989 |
|---|---|---|
| FR | 2714780 | 7/1995 |
| FR | 2742618 | 6/1997 |
| FR | 2752122 | 2/1998 |
| FR | 2763452 | 11/1998 |
| FR | 2830147 | 3/2003 |
| FR | 2700430 | 7/2004 |

OTHER PUBLICATIONS

Tung, Brian. "The Moron's Guide to Kerberos, Version 1.2.2." Accessed on Oct. 4, 2006. Published Dec. 2006. http://web.archive.org/web/20000815233731/http://www.isi.edu/~brian/security/kerberos.html.*
Schneier, Bruce. Applied Cryptographpy. 2nd Edition. John Wiley & Sons, 1997. pp. 39, 52-55.*
Search Report, PCT/US2004/007040, date Mar. 14, 2005.
Gilles Zemor: "Cours de Cryptography", Nov. 2000, Casssini, Paris, XP002313885, ISBN: 2-844225-020-6, pp. 165-173.
M. Prabhakaran, A. Sahai: "Concurrent Zero Knowledge Proofs with Logarithmic Round-Complexity"'Online!', May 6, 2002, pp. A, 1-19, XP002313883, URL:http://eprint.iacr.org/2002/055.pdf., pp. 3-5.
D. Micciancia E. Petrank: "Efficient and Concurrent Zero-Knowledge form any public coin HVZK protocol"'Online!, date Jul. 8, 2002, pp. 1-20, URL:http://eprint.iarc.org.
Search Report, PCT/US2004/007040, date Oct. 20, 2004.
U.S. Appl. No. 09/896,537, filed Jun. 30, 2001.
U.S. Appl. No. 10/107,388, filed Mar. 27, 2001.
U.S. Appl. No. 10/306,336, filed Nov. 27, 2002.

* cited by examiner

*Primary Examiner*—Kambiz Zand
*Assistant Examiner*—Jason K Gee
(74) *Attorney, Agent, or Firm*—Blakely, Sokoloff, Taylor & Zafman LLP

(57) ABSTRACT

A method, system, and apparatus are provided for establishing trust without revealing identity. According to one embodiment, values in a first proof corresponding to a first statement are precomputed, a request for a second proof is received from a challenger, and the first and second proofs are completed.

9 Claims, 14 Drawing Sheets

ESTABLISHING TRUST WITHOUT REVEALING IDENTITY

BACKGROUND OF THE INVENTION

1. Field of the Invention

This invention relates to secure communications and in particular to, an authentication system with anonymity for devices without the use of a Trusted Third Party.

2. Description of the Related Art

In many modern communication systems, including computer networks, the reliability and security of the information being exchanged is a significant concern. For example, in the Trusted Computing Platform Alliance (TCPA) model, each computer has a trusted hardware device called a Trusted Platform Module (TPM). TPM may record information about the software and hardware environment of the computer, with each TPM having a unique endorsement key (EK). A certificate, containing information about the TPM and platform, may be issued to EK. For an outside party (Challenger) to know the software and/or hardware environment of the computer, the challenger may ask the TPM to provide a report. The challenger would have to be certain that the report is really coming from a valid TPM, while the owner of the computer would want to maintain as much privacy as possible. For example, the owner of the computer may want to be able to give reports to two different challengers without those challengers being able to determine that the reports are coming from the same TPM.

One solution proposed by TCPA was to establish Trusted Third Parties (TTP). A TPM would create an Attestation Identity Key (AIK) and would send the public portion of the key in a certificate request signed by the EK to a TTP. The TTP would check that the EK was valid, i.e., the signature was okay, and would issue a certificate for the AIK. The TPM would then use the AIK and the certificate of the TTP when the TPM received a request from a challenger. Since these would be unrelated to the EK, the challenger would get no information about the AIK. However, the problem with this approach is that it requires TTPs to be established. In practice, identifying parties that can serve as TTPs and a feasible business model for this approach has proven to be a substantial obstacle.

Furthermore, a challenger may find it useful to be able to reject transactions from a TPM that the challenger suspected of being compromised. In order to find out whether a particular TPM transaction is compromised, a challenger may want to determine which transactions are associated with a particular TPM. Furthermore, because some cryptographic protocols require extensive computation, to have a protocol constructed in such a way that the majority of the computation may be performed off-line may be useful. None of the methods, apparatus, or systems available today provide for a cryptographic protocol that achieves anonymity and security requirements along with having the capability for identifying and rejecting suspected TPMs, and is constructed in such a way that the majority of computation is performed off-line.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
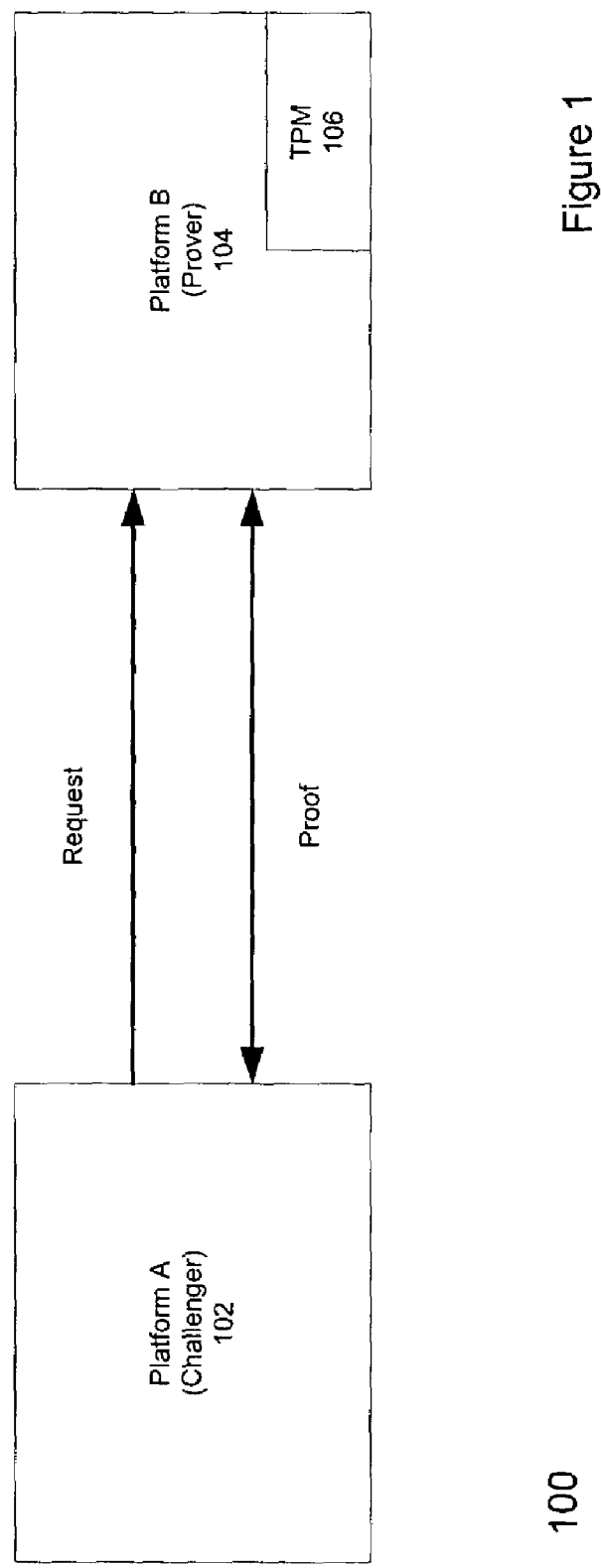
FIG. 1 is a block diagram conceptually illustrating a system where a direct proof scheme may be implemented, according to an embodiment.

A method and apparatus are described for secured communications. Broadly stated, embodiments of the present invention provide for an authentication system with anonymity for devices without the use of a Trusted Third Party (TTP).

A system, apparatus, and method are provided for establishing trust between a first device and a second device with regard to a valid signature without revealing identity, using the Direct Proof protocol. According to one embodiment, Direct Proof protocol refers to providing a method to prove to a challenger that a cryptographic key came from a trusted hardware device (device) without revealing information about the identity of the device. Direct Proof protocol may require computation to be performed by the device, commonly known as a Trusted Platform Module (TPM), within the Trusted Computing Platform Alliance (TCPA).

According to one embodiment, the Direct Proof protocol may have two options: a random h option and a named h option. The random h option may refer to the method in which the TPM may choose the value of h, which may be used as the base for constructing proof, on a random or pseudo-random basis, and may perform most of the computations necessary to construct the proof before the TPM may know the corresponding challenger. The named h option may refer to the method in which the TPM may generate the value of h using the name of the challenger. Typically, the named h generation may allow for the computation to construct the proof to occur until after the TPM is aware of the corresponding challenger. According to one embodiment, using the named h option, the majority of computation to construct the proof may be performed off-line or during the pre-computation stage.

According to one embodiment, values in a proof corresponding to a first statement may be precomputed by a Prover Device (Prover). Upon receiving a request for a second proof from a Challenger Device (Challenger), the Prover may complete a first proof and a second proof, and send the second proof to the Challenger. According to one embodiment, the second proof may include the proof that a second statement is true if the first statement is true. Furthermore, values in the second proof may include values provided by the Challenger. According to one embodiment, the first and/or second statement may include holding a cryptographic key on a trusted hardware device.

Typically, during manufacturing, each TPM is given a unique private secret pair (m,c), which satisfies $m=c^e \bmod n$. To prove to a challenger that the TPM contains a private secret pair, the TPM may obtain a value for h to use as a base. For example, the TPM may compute $k=h^m \bmod P$ and give h,k to the challenger. The TPM may then construct the proof that the TPM possesses m,c, such that $m=c^e \bmod n$ and $k=h^m \bmod P$, without revealing any additional information about m and c. TPM may use different h values with different challengers so that the challengers may not know that they received the proof from the same TPM.

According to one embodiment, using the named h option, the majority of computation to construct the proof may be performed off-line or during the precomputation stage. For example, according to one embodiment, a TPM may start with a random h method, such that the TPM chooses a random h, compute $k=h^m \bmod P$, and construct the proof of k having the right form. When the TPM is presented with a named h, $h_{NAME}$ from the challenger, the TPM may compute $k=h^m \bmod P$. Subsequently, the TPM may provide values for h, k, $h_{NAME}$, and $k_{NAME}$ to the challenger. According to one embodiment, TPM may use the proof that it has already constructed to show that h, k have the right form and construct a proof that h, k have the same form as $h_{NAME}, k_{NAME}$. Stated differently, TPM may provide to the challenger the proof that there exits a value for m, such that $k=h^m \bmod P$ and $k_{NAME}=h_{NAME}^m \bmod P$ for the same m, without actually revealing the value of m.

According to one embodiment, a method, system, and apparatus is provided to provide to a challenger the result of a one-way function of a secret held by a prover device, for example, the requesting device, and to prove to the challenger that the secret used in the one-way function has been signed by a device signature without revealing the secret or the signature to the challenger.

According to one embodiment, the term "prover", for example, prover device, may refer to any person, platform, system, software, and/or device that has been requested to provide some proof of its authority, validity, and/or identity. According to one embodiment, to "prove" or "convince" a challenger that a prover has or knows a signature or secret may mean that, based on the information and/or proof disclosed to the challenger, the prover is likely to have the signature or secret. To prove this to a challenger without "revealing" or "disclosing" the signature or secret to the challenger may mean that, based on the information disclosed to the challenger, to determine the signature or secret may be computationally infeasible. Such proofs may be preferred to as direct proofs. The term "direct proof" may refer to well-known interactive proofs and/or zero-knowledge proofs.

In the following description, certain terminology is used to describe certain features of one or more embodiments. For instance, "platform" may include any type of device, computer, processing unit, etc. The term "challenger" may refer to any person, platform, system, software, and/or device that requests some verification of authenticity or authority from a requester prior to disclosing or providing the requested information to the requester. The term "device manufacturer" (e.g., Device Manufacturer C) may refer to any person, platform, system, entity, software, and/or device that manufactures or configures a device or platform (e.g., a Trusted Platform Module). The term "device manufacturer" may also be used interchangeably with the term "certifying manufacturer". The term "HASH" may refer to any hashing function or algorithm or its equivalent. Furthermore, throughout the description and illustration of the various embodiments, coefficients, variables, and other symbols are referred to by the same label or name. For example, symbol h may be referred to as h throughout the description and illustration of the various embodiments in this application.

In the following description, for the purposes of explanation, numerous specific details are set forth in order to provide a thorough understanding of the present invention. It will be apparent, however, to one skilled in the art, based on the disclosure provided herein, that the embodiments of the present invention may be practiced without some of these specific details. In other instances, well-known structures and devices are shown in block diagram form.

The embodiments of the present invention include various steps, which will be described below. The steps may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The embodiments of the present invention may be provided as a computer program product that may include a machine-readable medium, having stored thereon instructions which may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a calTier wave or other propagation medium via a communication link (e.g., a modem or network connection).

FIG. 1 is a block diagram conceptually illustrating a system where a direct proof scheme may be implemented, according to an embodiment. As illustrated, a platform, such as Platform A 102 (Challenger), requests that another platform, such as Platform B 104 (Prover), provide information about itself. In response, Platform B 104 may provide the requested information. However, Platform A 102 may want to verify that the requested information came from a device manufactured by a particular device manufacturer, such as Device Manufacturer C. In order to verify that the information came from Device Manufacturer C, Platform A 102 may challenge Platform B 104 to provide the proof of a signature generated by Device Manufacturer C. Platform B 104 may reply to such request by providing information which may convince Platform A 102 that Platform B 104 holds a signature generated by Device Manufacturer C, without actually revealing the signature.

According to one embodiment, Platform B 104 may include a Trusted Platform Module (TPM) 106. TPM 106 may be manufactured by a device manufacturer so that the TPM may perform functions necessary to perform various embodiments and conform to the operations of the protocols described herein. Furthermore, TPM 106 may be manufactured to maintain the security features described herein. For example, TPM may perform specified functions using specified values as they related to a protocol, such as protocol IP1. Additionally, according to one embodiment, TPM may be manufactured or configured to use certain values to not create a security flaw, such as making it likely that a device's identity could be determined, in the protocol.

Figure 2:
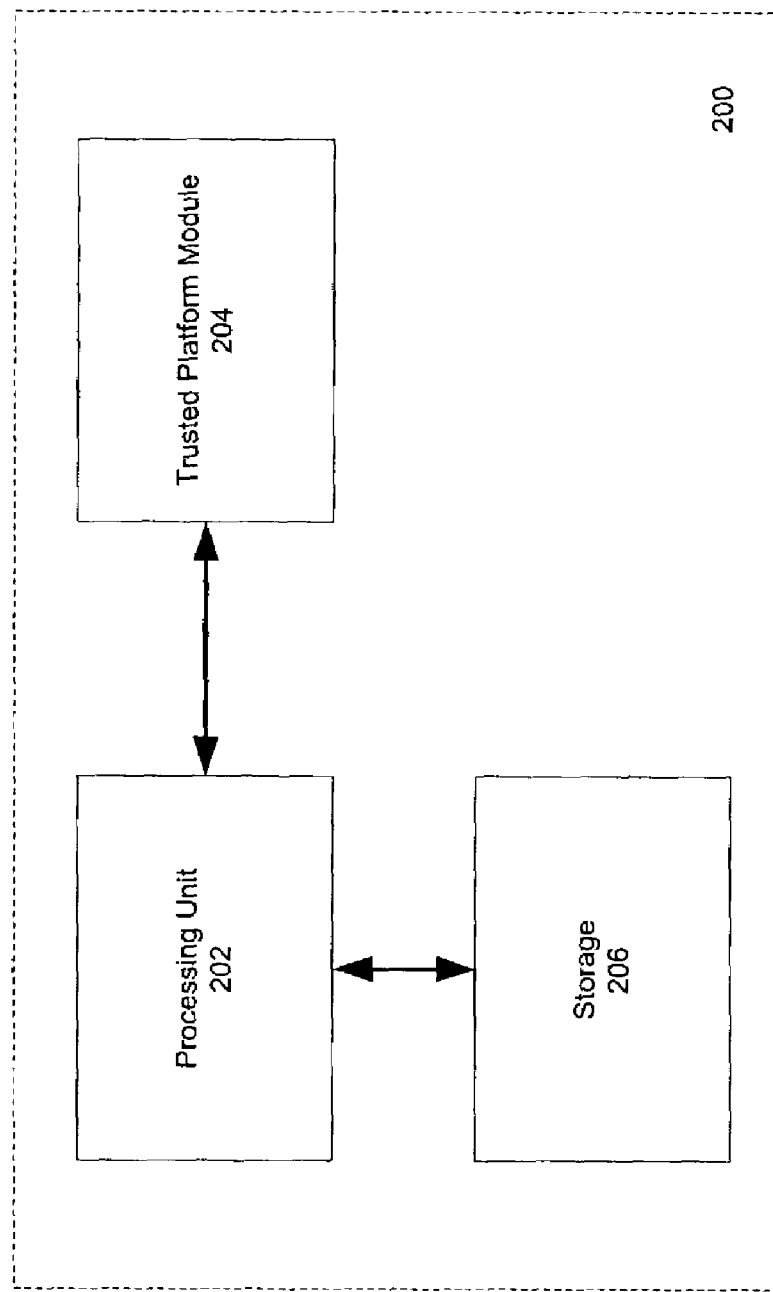
FIG. 2 is a block diagram conceptually illustrating a platform including a Trusted Platform Module, according to one embodiment.

FIG. 2 is a block diagram conceptually illustrating a platform including a Trusted Platform Module (TPM), according to one embodiment. As illustrated, a device or platform 200 (e.g., Platform B 104) may include a Trusted Platform Module (TPM) 204, according to one embodiment. Furthermore, the device 200 may include a processing unit 202 coupled with the TPM 204 and a storage device or mechanism 206. The storage device may permit storage of information about the device 200, such as hardware information and software information. According to one embodiment, platform or device 200 may be an electronic device such as a computer or mobile device.

Figure 3:
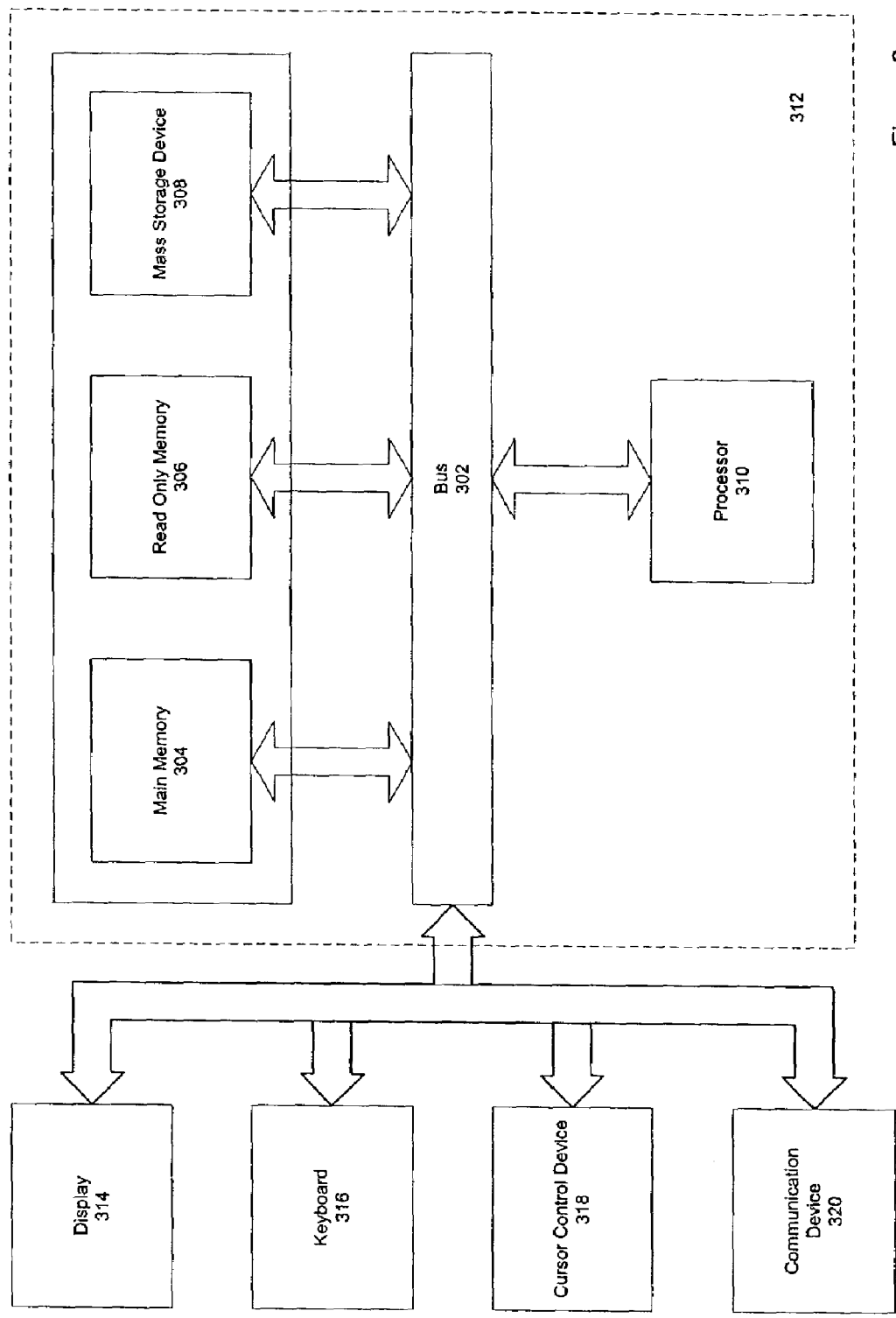
FIG. 3 is a block diagram conceptually illustrating a computer system where embodiments of the present invention may be implemented.

FIG. 3 is a block diagram conceptually illustrating a computer system where embodiments of the present invention may be implemented. Computer system 300 includes a bus or other communication means 302 for communicating information, and a processing means such as processor 310 coupled with bus 302 for processing information. Computer system 300 further includes a random access memory (RAM) or other dynamic storage device 304 (referred to as main memory), coupled to bus 302 for storing information and instructions to be executed by processor 310. Main memory 304 also may be used for storing temporary variables or other intermediate information during execution of instructions by processor 310. Computer system 300 also includes a read only memory (ROM) and/or other static storage device 306 coupled to bus 302 for storing static information and instructions for processor 310.

A data storage device 308 such as a magnetic disk or optical disc and its corresponding drive may also be coupled to computer system 300 for storing information and instructions. Computer system 300 can also be coupled via bus 302 to a display device 314, such as a cathode ray tube (CRT) or Liquid Crystal Display (LCD), for displaying information to an end user. Typically, an alphanumeric input device 316, including alphanumeric and other keys, may be coupled to bus 302 for communicating information and/or command selections to processor 310. Another type of user input device is cursor control 318, such as a mouse, a trackball, or cursor direction keys for communicating direction information and command selections to processor 310 and for controlling cursor movement on display 314.

A communication device 320 is also coupled to bus 302. The communication device 320 may include a modem, a network interface card, or other well-known interface devices, such as those used for coupling to Ethernet, token ring, or other types of physical attachment for purposes of providing a communication link to support a local or wide area network, for example. In this manner, the computer system 300 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 300 will vary from implementation to implementation depending upon numerous factors, such as price constraints, performance requirements, technological improvements, and/or other circumstances.

It should be noted that, while the steps described herein may be performed under the control of a programmed processor, such as processor 310, in alternative embodiments, the steps may be fully or partially implemented by any programmable or hard-coded logic, such as Field Programmable Gate Arrays (FPGAs), transistor-transistor logic (TTL) logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 4:
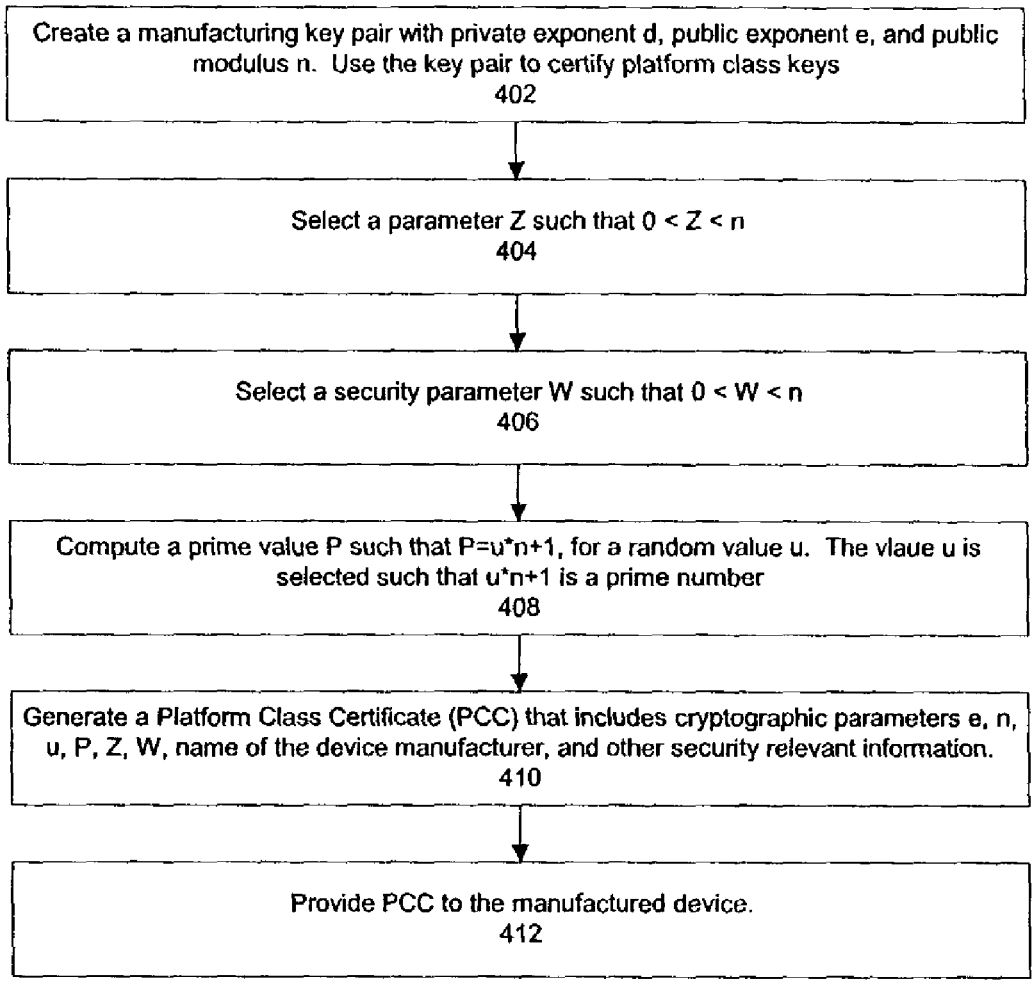
FIG. 4 is a flow diagram conceptually illustrating a process of setting up a Trusted Platform Module (TPM) during manufacturing, according to one embodiment.

FIG. 4 is a flow diagram conceptually illustrating a process of setting up a Trusted Platform Module (TPM) during manufacturing, according to one embodiment. According to one embodiment, a platform class may be defined by a device manufacturer to include one or more types of platforms or devices. For example, a platform class may refer to a set of all platforms having same security relevant information. Each platform may have a set of security relevant information about the platform. This security relevant information may include information that may be included in the TPM's unique endorsement key (EK) and/or attestation identity key (AIK) certificate in the Trusted Computing Platform Alliance (TCPA) model. The security relevant information may also include the manufacturer and model number of a particular platform or device. For each platform class, a device manufacturer may create a set of cryptographic parameters that the manufacturer may use for that platform class. Furthermore, the device manufacturer may create a signature key that it may use to sign the secrets for the devices (e.g., device 200) that it manufactures.

According to one embodiment, a device manufacturer may employ the (Rivest, Shamir, Adelman) RSA algorithm (a public-key cryptosystem defined by Ronald Rivest, Adi Shamir, and Leonard Adelman) to create a RSA public, private key pair with public modulus n, public exponent e, and private exponent d at processing block 402. The RSA public, private key pair with public modulus n, public exponent e, and private exponent d may be created using well-known methods, such as those described in *Applied Cryptography*, by Bruce Schneier, John Wiley & Sons; ISBN: 0471117099; Second Edition (Oct. 18, 1995).

According to one embodiment, modulus n may be chosen large enough so that factor n may be computationally infeasible. The device manufacturer may specify a parameter Z, which may be an integer between zero (0) and n at processing block 404. The device manufacturer may also specify a security parameter W, which may be an integer between zero (0) and n at processing block 406. However, picking W too small or too large may introduce a security failure. According to one embodiment, W may be chosen between $2^{160}$ and $n/2^{160}$. Accordingly, choosing W to be approximately $2^{160}$ may be considered a reasonable choice.

According to one embodiment, the device manufacturer may compute a prime number P, such that P=u*n+1 at processing block 408. There may not be anything significant about the value of u, other than that u*n+1 is a prime number. For example, the smallest of the u value may be used. According to one embodiment, P may be large enough so that computing discrete logarithms mod P may be computationally infeasible.

According to one embodiment, the device manufacturer may generate a Platform Class Certificate (PCC) that may include the cryptographic parameters e, n, u, P, Z, W, the security relevant information of the platform class, and the name of the device manufacturer at processing block 410. According to one embodiment, both parameters u and P may not be included, as by using the given value of n and one of the above-mentioned parameters, the value of the other (i.e., P or u) may be computed by using P=u*n+1.

According to one embodiment, the device manufacturer may use the same value of parameters e, n, u, P, W for various platform classes, and may vary the value of Z for the various platforms. According to one embodiment, the values of Z may be chosen to differ by at least 4W. Once the PCC is generated, according to one embodiment, the device manufacturer may provide or allocate the PCC to the devices it manufactures, belonging to a particular platform class at processing block 412.

According to one embodiment, the distribution of the PCC from a prover device or platform, such as Platform A in FIG. 1, to a challenger may be accomplished in a number of ways without deviating from one or more embodiments. For example, PCC may be distributed to the challenger in such a way that the challenger may be convinced that the PCC was generated by a particular device manufacturer, in accordance with one or more of the accepted standard methods. Some of the accepted standard methods may include performing the task by distributing the parameters directly to the challenger or by having the PCC signed by a certifying authority. Using the latter case, according to one embodiment, the public key of the certifying authority may be distributed to the challenger, and the signed Platform Class Certificate may be given to each device or platform (e.g., prover device) in the Platform Class. The device may then give the signed Platform Class Certificate to the challenger.

Figure 5:
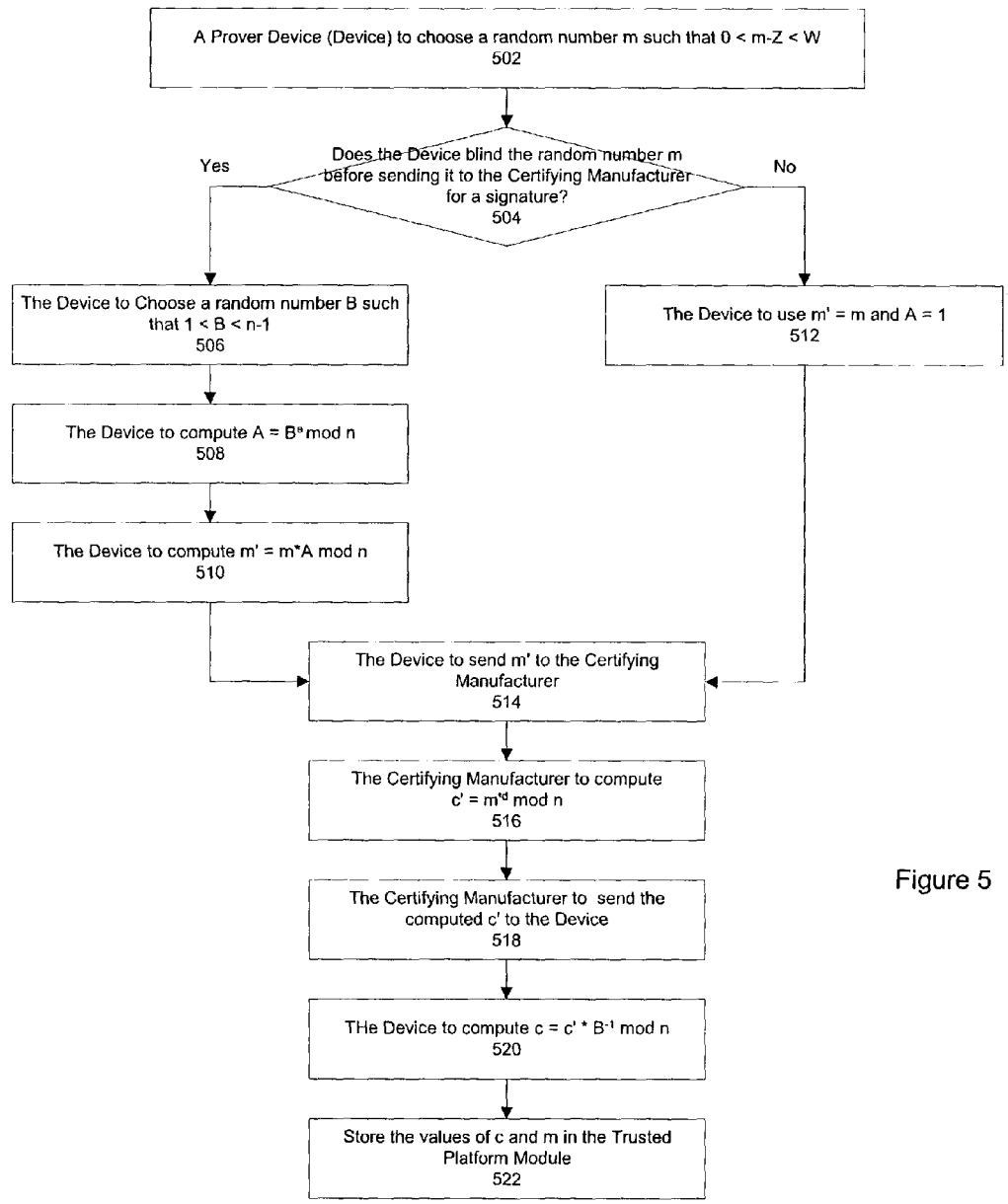
FIG. 5 is a flow diagram conceptually illustrating a process of the setup performed for each platform manufactured, according to one embodiment.

FIG. 5 is a flow diagram conceptually illustrating a process of the setup performed for each platform manufactured, according to one embodiment. According to one embodiment, a Prover Device (Device) may choose a random number m such that $0<m-Z<W$ at processing block 502. At decision block 504, whether the Device blinded the random number m before sending it to the Certifying Manufacturer for a signature is determined. According to one embodiment, if the Device blinded random number m before sending it to the Certifying Manufacturer for a signature, the Device may choose a random number B between 1 and n−1 at processing block 506, and may compute $A=B^e$ mod n at processing block 508. The Device may compute m'=m*A mod n at processing block 510. If the Device does not blind m, then the Device may use m'=m and A=1 at processing block 512.

According to one embodiment, the Device may send m' to the Certifying Manufacturer at processing block 514. The Certifying Manufacturer may compute $c'=m'^d$ mod n at processing block 516, and may give c' to the Device at processing block 518. The Device may compute $c=c'*B^{-1}$ mod n at processing block 520, implying that $c=m^d$ mod n. The numbers for c and m may then be stored in the Trusted Platform Module (TPM) at processing block 522. The pair of c and m may be referred to as a signature of the Device Manufacturer.

Figure 6:
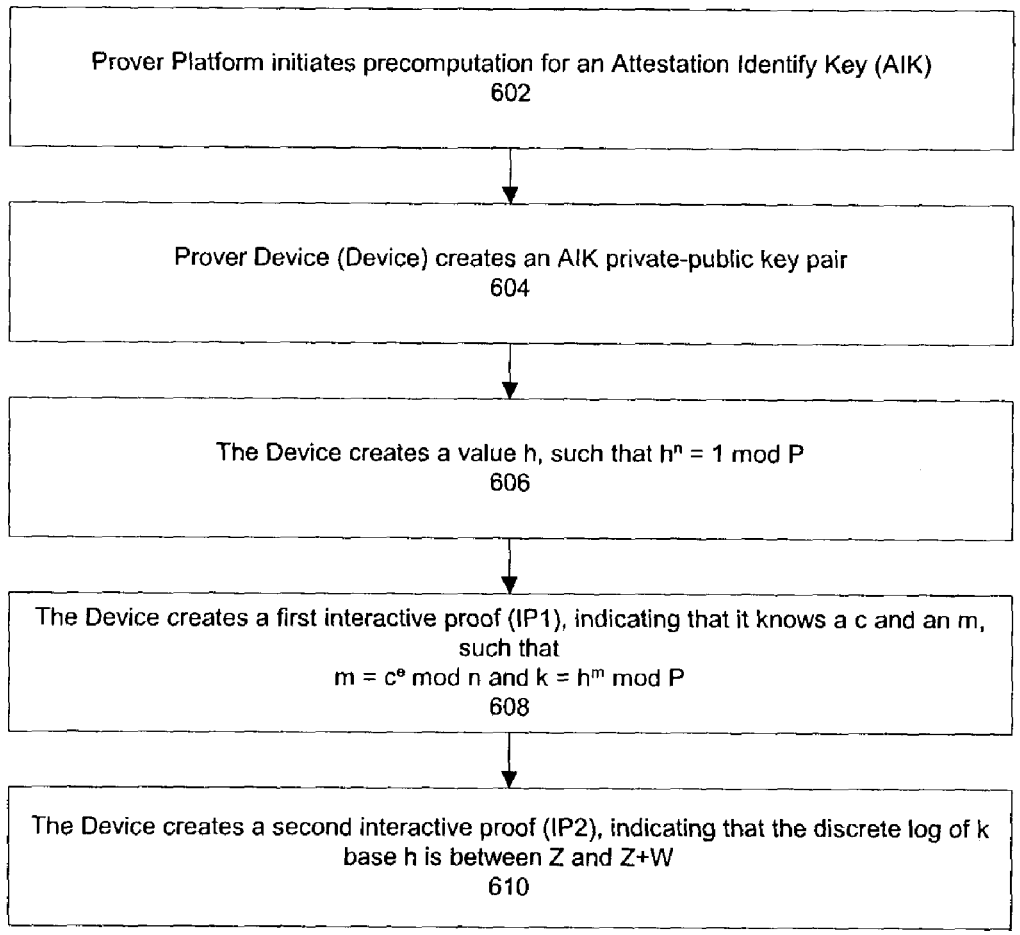
FIG. 6 is a flow diagram conceptually illustrating a precomputation process, according to one embodiment.

FIG. 6 is a flow diagram conceptually illustrating a precomputation process, according to one embodiment. According to one embodiment, the precomputation resulting from a precomputation process, as illustrated in FIG. 6, may be used at a later time by a Trusted Platform Module (TPM) to prove to a challenger that an Attestation Identity Key (AIK) was generated by the TPM. First, a Prover Platform (Platform) may initiate precomputation for an AIK at processing block 602. According to one embodiment, the AIK may be a RSA (Rivest, Shamir, Adelman) public/private key pair. A trusted hardware device, such as the TPM in a Prover Device (Device), e.g., Device B 104 in FIG. 1, may create an AIK private-public key pair at processing block 604. The private-public key pair may include a public key and a private key. According to one embodiment, AIK may have been created sometime earlier. The Device may create or generate a value h at processing block 606. According to one embodiment, the value h may be a randomly or pseudo-randomly generated value, having the property $h^n=1$ mod P. For example, the Device may select a random number j between 1 and n−1, and compute $h=j^u$ mod P. Furthermore, the value h may be unique to the AIK. The Device may then compute a value $k=h^m$ mod P.

According to one embodiment, the Device may perform precomputation for an interactive proof specific to h and k. The interactive proof may indicated that it knows a pair of values c and m, such that $m=c^e$ mod n, $k=h^m$ mod P, and that m is between Z and Z=W. According to one embodiment, this interactive proof may be computed in two segments. The Device may perform precomputation for a first interactive proof (IP1), indicating that it knows a pair of values c and m such that $m=c^e$ mod n and $k=h^m$ mod P at processing block 608. The Device may also perform precomputation for a second interactive proof (IP2) indicating that the discrete log of k base h is between Z and Z+W at processing block 610. According to one embodiment, the two interactive proofs, IP1 and IP2, may together form an interactive proof that the TPM knows a pair of values c and m such that $m=c^e$ mod n, $k=h^m$ mod P, and that m is between Z and Z+W.

Figure 7:
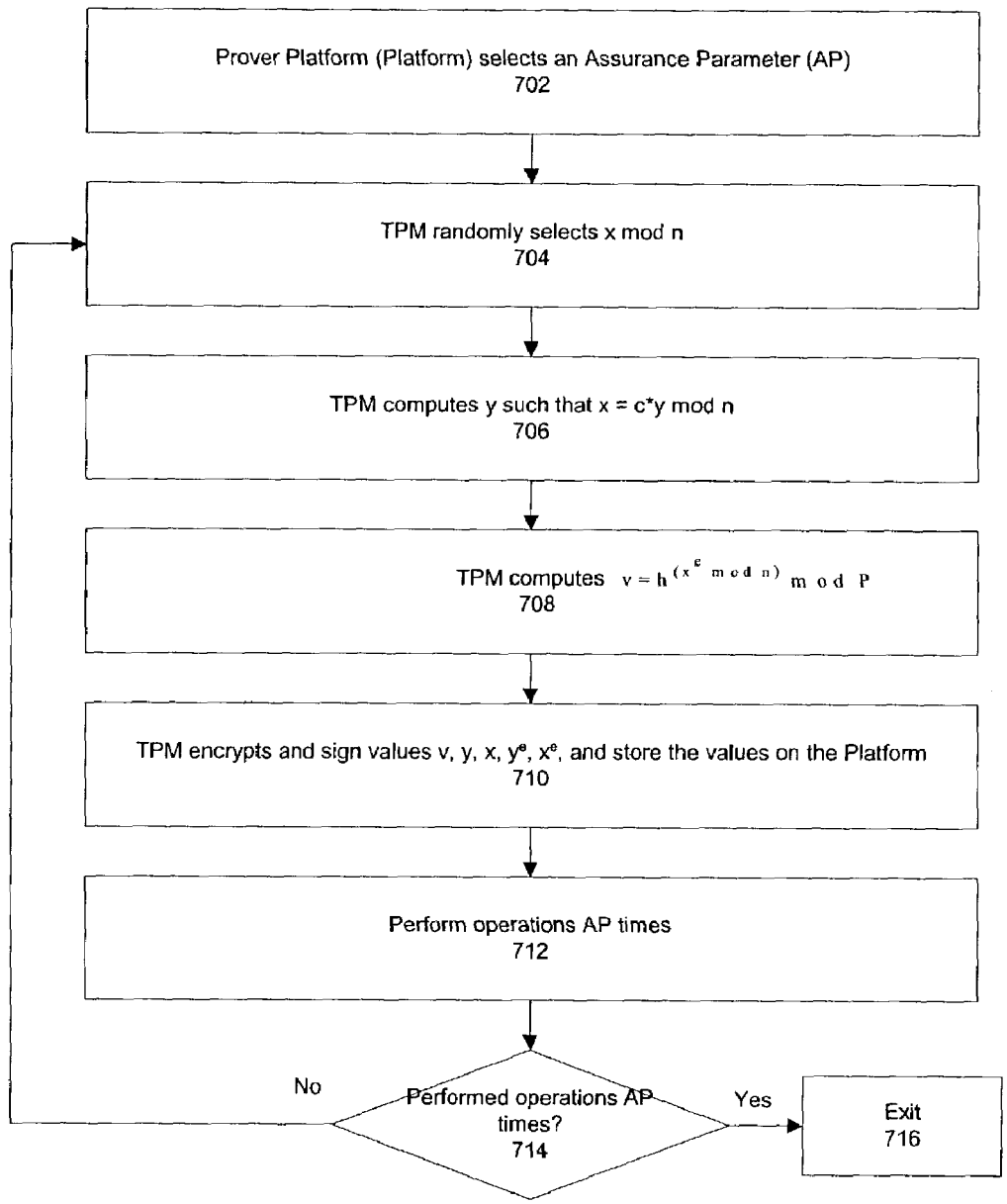
FIG. 7 is a flow diagram conceptually illustrating precomputation of a first interactive proof, according to one embodiment.

FIG. 7 is a flow diagram conceptually illustrating precomputation of a first interactive proof, according to one embodiment. The first interactive proof (IP1), as with respect to FIG. 6, may be employed to prove that a Trusted Platform Module (TPM) knows values c and m, such that $m=c^e$ mod n and $k=h^m$ mod P, without the TPM of the Prover Device (Device) revealing c or m. First, as illustrated, a Prover Platform (Platform) may select an Assurance Parameter (AP) at processing block 702. According to one embodiment, the value of AP may be a fixed number, for example, sixty (60). According to another embodiment, the Platform may select the value of AP. According to one embodiment, the Platform may select a fixed value of AP, while the challenger may select a different value of AP.

If the challenger picks a value of AP that is smaller than the one the Platform picked, then, according to one embodiment, the TPM may simply use only the first AP of the rounds and disregard the others. On the other hand, if the challenger picked a value of AP that was larger that the one the Platform picked, the TPM may use two different precomputations, use all of the rounds from one and some of the rounds from the other. The TPM may then use the proof, such as the one illustrated in FIG. 12, twice to show that discrete logarithms are the same for both precomputations and named h.

According to one embodiment, TPM may randomly select a value x mod n at processing block 704. TPM may compute a value y, such that x=c*y mod n, at processing block 706. TPM may also compute a value v, such that $v=h^{(x^e \bmod n)}$ mod P, at processing block 708. TPM may encrypt and sign the values v, y, x, $y^e$, $x^e$, and store the encrypted and signed values on the Platform at processing block 710. According to another embodiment, the TPM may store only some of the values v, y, x, $y^e$, $x^e$ and later recompute the others. According to one embodiment, the process of signing may be a digital signature. According to another embodiment, the process of signing may be to hash the values with a cryptographic hash function, such as Secure Hash Algorithm (SHA-1), and then encrypt the values and the hash. According to one embodiment, the verification scheme or operation may be performed AP times at processing 712. At decision block 714, whether the verification scheme has been performed AP times is determined. If the operation has been performed AP times, the operation ends at processing block 716, and if not, the operation continues at processing block 704.

Figure 8:
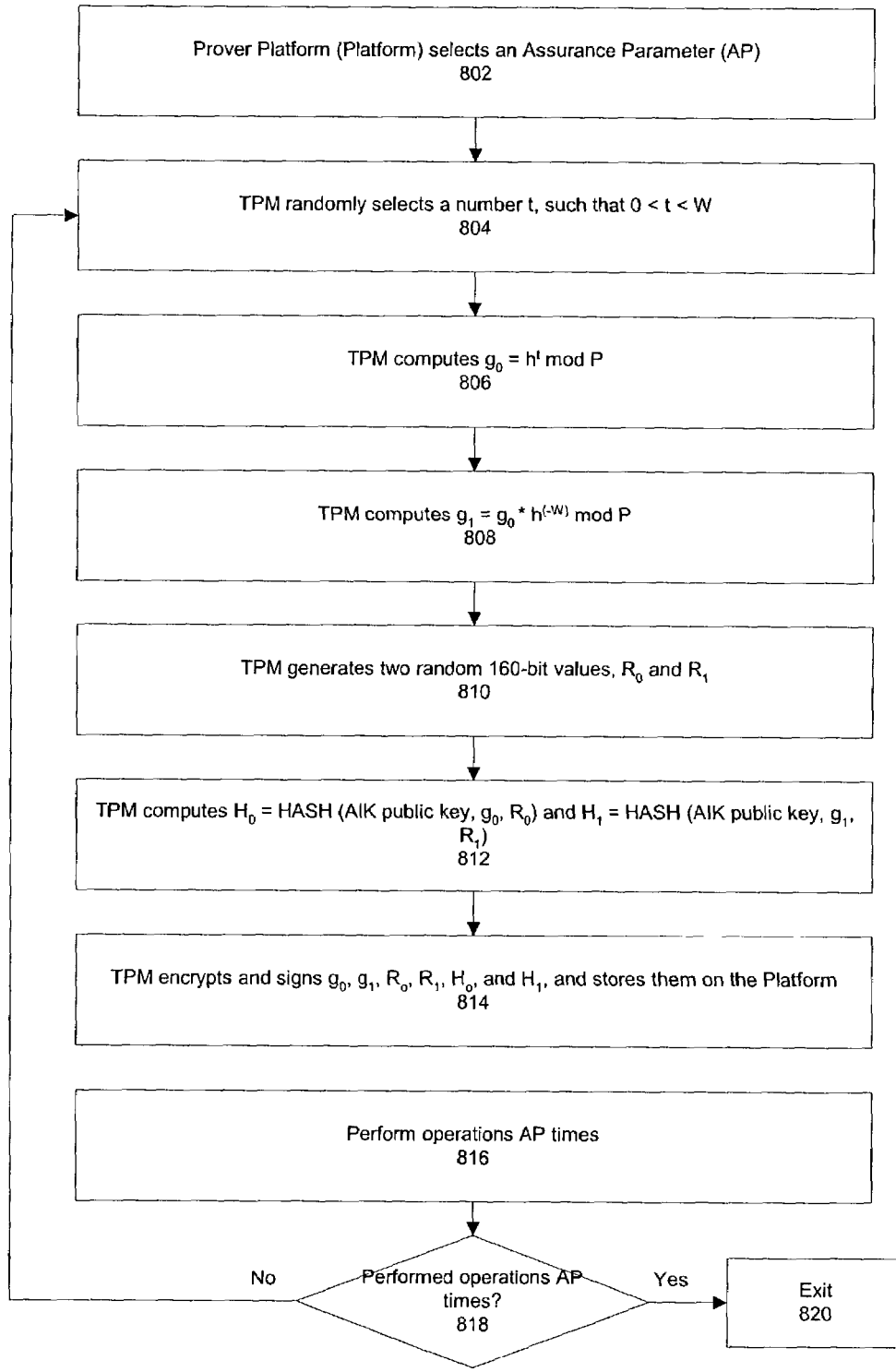
FIG. 8 is a flow diagram conceptually illustrating precomputation of a second interactive proof, according to one embodiment.

FIG. 8 is a flow diagram conceptually illustrating precomputation of a second interactive proof, according to one embodiment. The second interactive proof (IP2) may be employed to prove that a Trusted Platform Module (TPM) knows a value m, such that Z−W<m<Z+2*W, and k=$h^m$ mod P, without the TPM revealing m.

First, the Prover Platform (Platform) may select an Assurance Parameter (AP) at processing block 802. As with the precomputation of IP1, as illustrated in FIG. 7, according to one embodiment, the value of AP may be a fixed number, for example, sixty (60). According to another embodiment, the Platform may select the value of AP. According to one embodiment, the Platform may select a fixed value of AP, while the challenger may select a different value of AP.

If the challenger picks a value of AP that is smaller than the one the Platform picked, then, according to one embodiment, the TPM may simply use only the first AP of the rounds and disregard the others. On the other hand, if the challenger picks a value of AP that is larger that the one the Platform picked, the TPM may use two different precomputations, use all of the rounds from one and some of the rounds from the other. The TPM may then use the proof, for example, from FIG. 12, twice to show that discrete logarithms are the same for both precomputations and named h.

According to one embodiment, at processing block 804, the TPM of the Prover Device (Device) may randomly select a number t, such that 0<t<W 702. At processing block 806, the TPM may compute $g_0$=$h^t$ mod P. TPM may also compute $g_1$=$g_0$*$h^{(-w)}$ mod P at processing block 808. At processing block 810, the TPM may generate two random 160-bit values, $R_0$ and $R_1$. TPM may then compute $H_0$=HASH(AIK public key, $g_0$, $R_0$) and $H_1$=HASH(AIK public key, $g_1$, $R_1$) at processing block 812. At processing block 814, the TPM encrypts and signs values $g_0$, $g_1$, $R_0$, $R_1$, $H_0$, and $H_1$, and stores the values on the Platform. According to another embodiment, only some of the value $g_0$, $g_1$, $R_0$, $R_1$, $H_0$, and $H_1$ may be stored.

According to one embodiment, the above procedures may be repeated for AP times at processing block 816. At decision block 818, if the above procedures have been performed AP times, the operation is exited at processing block 820. If the procedures have not been performed AP times, the operation may continue at processing block 804. According to one embodiment, the repetition of the procedures for IP1, as illustrated in FIG. 7, and/or got IP2, as illustrated in FIG. 8, may make it less likely, for example, for an unauthorized or cheating prover to succeed in providing adequate proof to a challenger. Repeating a proof (e.g., IP1 or IP2) AP times may force a prover to succeed on each round, which is a 1 in $2^{AP}$ chance.

According to one embodiment, the Platform may choose to have multiple sets of AIK, and have precomputations of IP1 and IP2. The Platform may store these sets, until a challenger requests the proof for an AIK, and in response, the Platform may use one of the precomputed sets.

Figure 9:
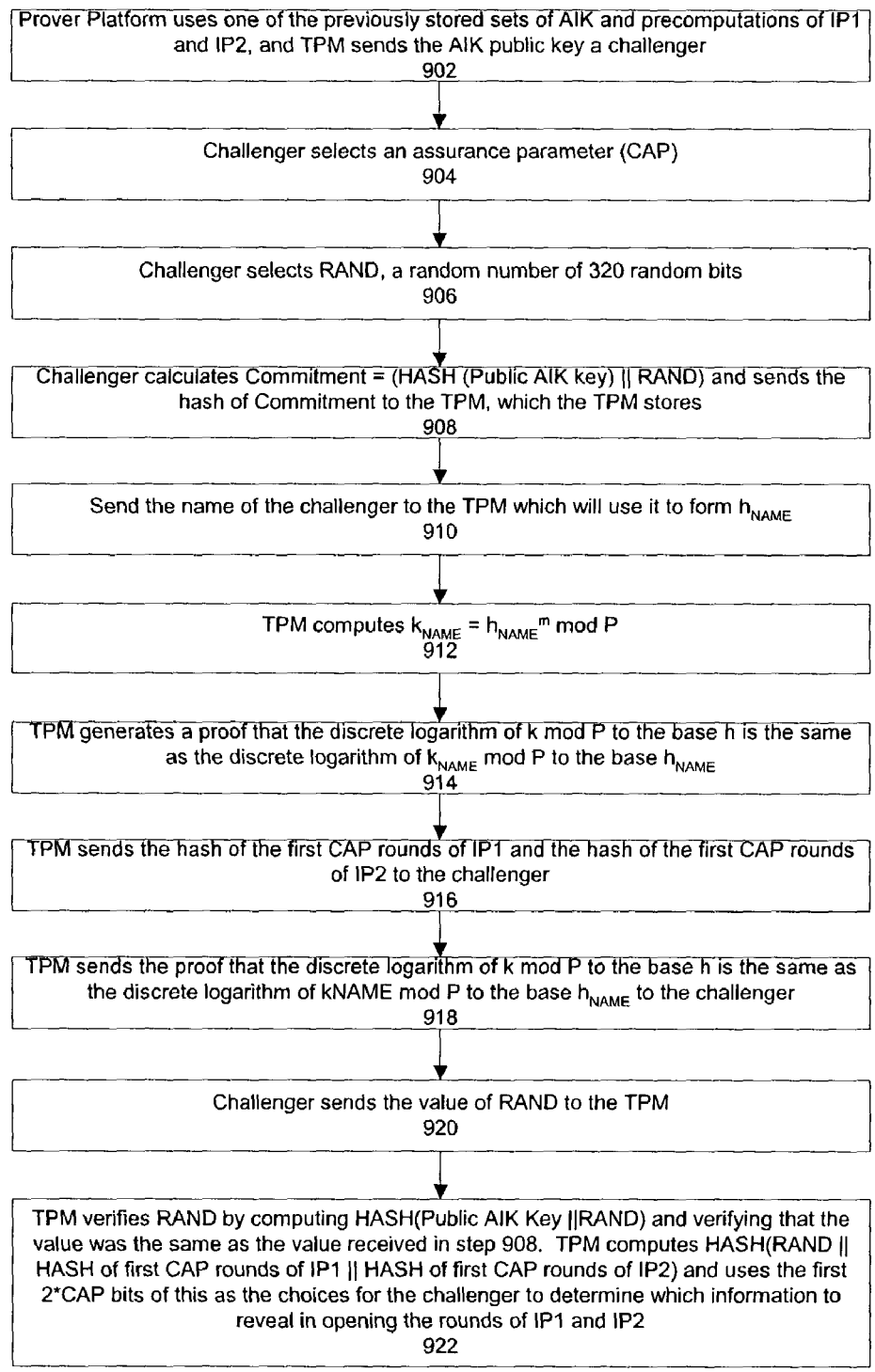
FIG. 9 is a flow diagram conceptually illustrating an online computation process, according to one embodiment.

FIG. 9 is a flow diagram conceptually illustrating an online computation process, according to one embodiment. According to one embodiment, the Prover Platform (Platform) may use one of the sets of Attestation Identity Key (AIK), and the precomputed first and second interactive proofs (IP1 and IP2) that the Platform may have previously stored, and a Trusted Platform Module (TPM) may send the AIK public key (or just the HASH of the AIK public key) to a challenger at processing block 902. The challenger may select an Assurance Parameter, also known as Challenger Assurance Parameter (CAP), at processing block 904. At processing block 906, the challenger may select a set of random bits (RAND). The challenger may select RAND by selecting, for example, three hundred twenty (320) random bits. The challenger may calculate Commitment=(HASH (Public AIK key)∥RAND), and may send the HASH of Commitment to the TPM, which the TPM may store at processing block 908. According to one embodiment, HASH may be a cryptographic hash function, such as SHA-1 (Secure Hash Algorithm).

At processing block 910, the name of the challenger may be sent to the TPM, which the TPM may use to form $h_{NAME}$. The value $h_{NAME}$ may have the property $h_{NAME}^n$=1 mod P. For example, a Prover Device (Device) may Hash the name of the challenger to form a number j between 1 and n−1, and compute $h_{NAME}$=$j^u$ mod P. According to one embodiment, to compute a $h_{NAME}$ value, $H_i$ may be computed, such that $H_i$=HASH (i, name of challenger), for several values, for example, ten (10), of i=1,2,3 . . . , 10 and then to let j=the concatenation of $H_1$∥$H_2$∥$H_3$ . . . ∥$H_{10}$. The Device may then compute $h_{NAME}$=$j^u$ mod P, where u=(P−1)/n, as defined earlier. The Device may also compute a $k_{NAME}$ value, such that $k_{NAME}$=$h_{NAME}$ mod P. TPM may then compute $k_{NAME}$=$h_{NAME}^m$ mod P at processing block 912.

Figure 12:
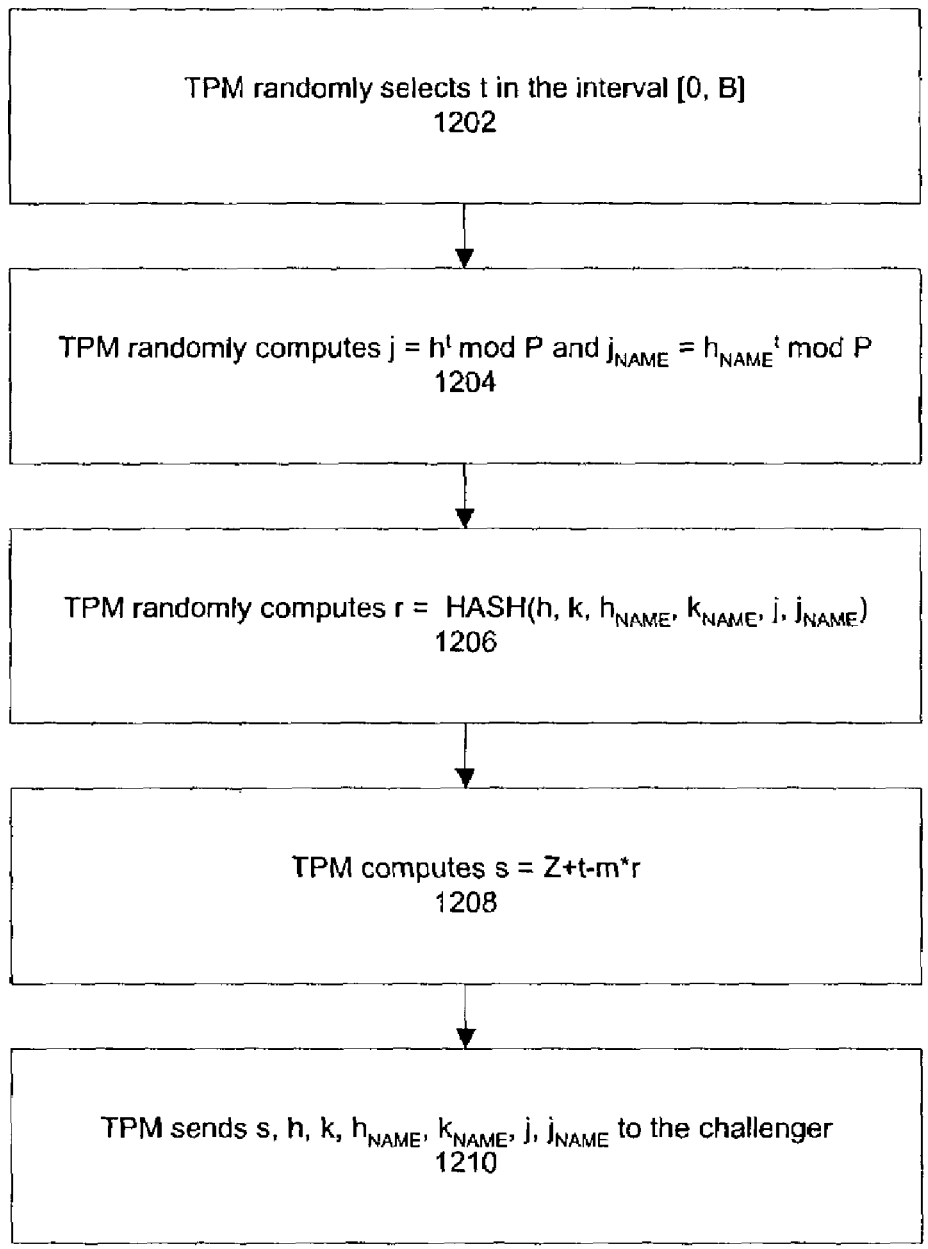
FIG. 12 is a flow diagram conceptually illustrating the creation of a proof that two discrete logarithms are the same, according to one embodiment.

At processing block 914, the TPM may generate a proof that the discrete logarithm of k mod P to the base h is the same as the discrete logarithm of $k_{NAME}$ mod P to the base $h_{NAME}$, as illustrated in FIG. 12. TPM may send the hash of the first CAP rounds of IP1 and the hash of the first CAP rounds of IP2 to the challenger at processing block 916. TPM may also send the proof that the discrete logarithm of k mod P to the base h is the same as the discrete logarithm of $k_{NAME}$ mod P to the base $h_{NAME}$ to the challenger at processing block 918. At processing block 920, the challenger may send the value of RAND to the TPM. TPM may verify the value of RAND by calculating the value of HASH (Public AIK key)∥RAND), and verifying that this gives the same value that was received from the challenger in block 908. The TPM may calculate the value of CHOICES=HASH(RAND∥HASH of the first CAP rounds of IP1∥HASH of the first CAP rounds of IP2). The TPM may use the first 2*CAP bits of CHOICES as the choices for the challenger to determine which information to reveal in opening the rounds of IP1 and IP2 at processing block 922. According to one embodiment, the challenger may not require the use of $h_{NAME}$ and may accept the proof based only on the first interactive proof (IP1) and the second interactive proof (IP2) for the precomputed values h, k.

According to one embodiment, Assurance Parameter (AP) selected by the Platform and the CAP selected by the Challenger may be required to be of the same fixed value, for example, sixty (60). According to another embodiment, the Platform may select a fixed value of AP, while the challenger may select a different value for CAP. According to one embodiment, if the challenger picks a value of CAP that is smaller than the value of AP the Platform picked, the TPM may simply use only the first CAP of the rounds and disregard the others. On the other hand, if the challenger picks a value of CAP that is larger that the value of AP that the Platform picked, the TPM may use two different precomputations, use all of the rounds from one and some of the rounds from the other. The TPM may then use the proof, as illustrated in FIG. 12, twice to show that discrete logarithms are the same for both the precomputations and $h_{NAME}$, $k_{NAME}$.

Figure 10:
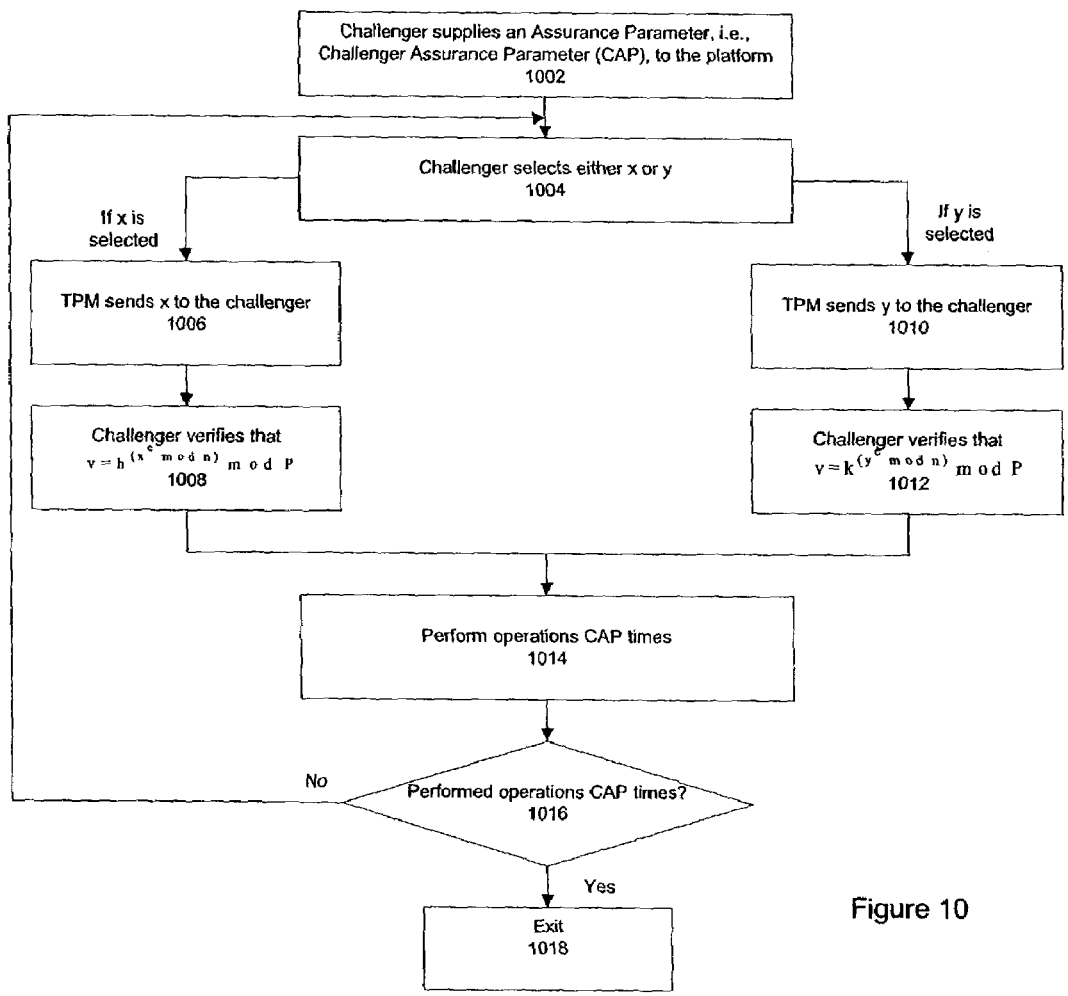
FIG. 10 is a flow diagram conceptually illustrating the opening of the rounds for a first interactive proof, according to one embodiment.

FIG. 10 is a flow diagram conceptually illustrating the opening of the rounds for a first interactive proof, according to one embodiment. The first interactive proof (IP1) may be employed to prove that a Trusted Platform Module (TPM) knows values c and m, such that $m=c^e$ mod n and $k=h^m$ mod P, without the TPM of the Prover Device (Device) revealing c or m. First, according to one embodiment, the challenger supplies a Challenger Assurance Parameter (CAP) to a Prover Platform (Platform) at processing block 1002. At processing block 1004, the challenger may make a choice to receive either x or y. If the challenger selects choice x, the TPM may send x to the challenger at processing block 1006. After receiving the value of x, the challenger may verify that $v=h^{(x^e \bmod n)}$ mod P at processing block 1008.

If the challenger chooses to receive choice y, according to one embodiment, the TPM may send y to the challenger at processing block 1010. The challenger may verify that $v=k^{(y^e \bmod n)}$ mod P at processing block 1012. According to one embodiment, this verification scheme or operation may be performed CAP times at processing block 1014. If the operation is performed CAP times, the operation may be exited at processing block 1018. If the operation is not performed CAP times, the operation may continue at processing block 1004.

According to one embodiment, the TPM may send the responses described in processing blocks 1006 and 1010 to the Platform, and the Platform may save all of the responses until the TPM has provided the CAPs of these responses. The Platform may then send all of the responses to the challenger. The challenger may then perform the verifications described in blocks 1008 and 1012.

Figure 11:
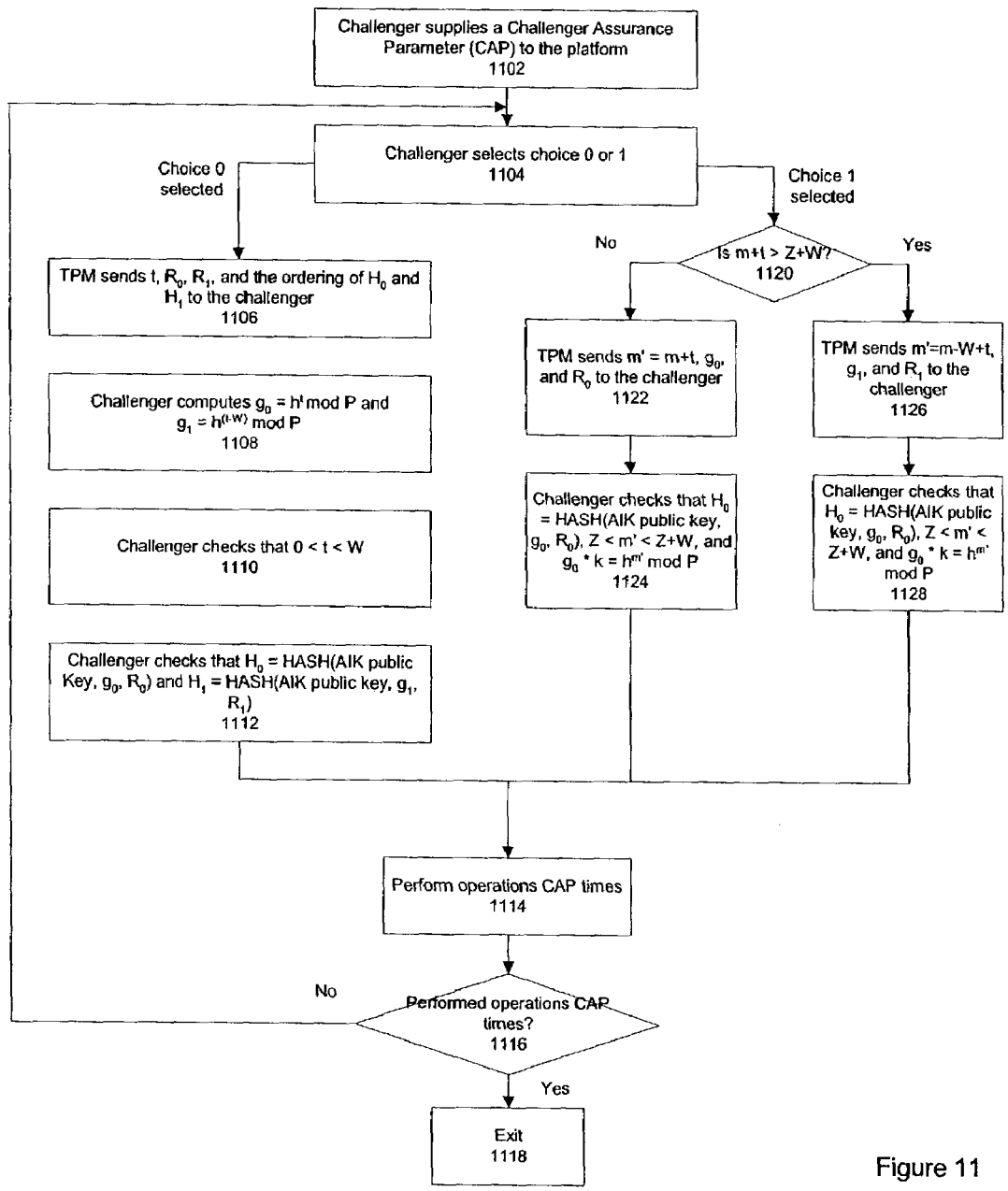
FIG. 11 is a flow diagram conceptually illustrating the opening of the rounds for a second interactive proof, according to one embodiment.

FIG. 11 is a flow diagram conceptually illustrating the opening of the rounds for a second interactive proof, according to one embodiment. The second interactive proof (IP2) may be employed to prove that a Trusted Platform Module (TPM) knows a value m, such that Z-W<m<Z+2*W, and $k=h^m$ mod P, without the TPM revealing m. The challenger may supply an Assurance Parameter, i.e., Challenger Assurance Parameter (CAP), at processing block 1102. The challenger may select from two choices, for example, either choice 0 or 1 at processing block 1104.

If the challenger selects choice 0, according to one embodiment, the TPM may send values t, $R_0$, $R_1$, and the ordering of $H_0$ and $H_1$ to the challenger at processing block 1106. The challenger may compute $g_0=h^t$ mod P and $g_1=h^{(t-W)}$ mod P at processing block 1108. The challenger may then check that 0<t<W at processing block 1110. The challenger may check that $H_0$=HASH(AIK public key, $g_0$, $R_0$) and $H_1$=HASH(AIK public key, $g_1$, $R_1$) at processing block 1112. According to one embodiment, the operation or procedures are performed for CAP times at processing block 1114. At decision block 1116, if the operation has been performed for CAP times, the operation may be exited at processing block 1118. If the operation has not been performed for CAP times, the operation may continue at processing block 1104.

If the challenger selects choice 1, at decision block 1120, whether m+t>Z+W is determined. If m+t is not >Z+W, i.e., m+t is in the interval between Z and Z+W, the TPM may send m'=m+t, $g_0$ and $R_0$ to the challenger, at processing block 1122, and may inform the challenger to use the $H_0$. The challenger may check that $H_0$=HASH(AIK public key, $g_0$, $R_0$), and that Z<m'<Z+W, and that $g_0 * k = h^{m'}$ mod P at processing block 1124. According to one embodiment, the operation or procedures are performed for CAP times at processing block 1114. At decision block 1116, if the operation has been performed for CAP times, the operation may be exited at processing block 1118. If the operation has not been performed for CAP times, the operation may continue at processing block 1104.

If m+t>Z+W, the TPM may send m'=m−W+t, $g_1$ and $R_1$ to the challenger, at processing block 1126, and may inform the challenger to use the $H_1$. The challenger may check that $H_1$=HASH(AIK public key, $g_1$, $R_1$), and that Z<m'<Z+W, and that $g_1 * k = h^{m'}$ mod P at processing block 1128. According to one embodiment, the operation or procedures are performed for CAP times at processing block 1114. At decision block 1116, if the operation has been performed for CAP times, the operation may be exited at processing block 1118. If the operation has not been performed for CAP times, the operation may continue at processing block 1104.

According to one embodiment, repeating the procedure for a first interactive proof (IP1) and/or a second interactive proof (IP2) may make it less likely for an unauthorized or cheating prover to succeed in providing adequate proof to a challenger. That is, repeating the number of rounds of a procedure (e.g., IP1 or IP2) CAP times may force a prover to succeed on each round, which is a 1 in $2^{CAP}$ chance. According to one embodiment, the rounds of protocol may vary from several rounds to only a few rounds of communications between the TPM of the Prover Device and the challenger.

According to one embodiment, the TPM may send the responses described in blocks 1106, 1122, and 1126 to the Platform, and the Platform may save all of the responses until the TPM has provided CAPs of these responses. The Platform may then send all of the responses to the challenger at once. The challenger may then perform the verifications described in blocks 1108, 1124, and 1128.

According to one embodiment, the Platform may save all of the TPM responses from both IP1 and IP2 until the TPM has provided all of the responses for both IP1 and IP2, and may then send all of the responses from both protocols to the challenger, simultaneously.

There are several possible options for the method in which the choices may be made by the challenger. According to one embodiment, the choices may be determined having the TPM form Hash of some of the values generated in IP1 and IP2 during the precomputation process, and using the output from this Hash to determine the choices of the challenger.

FIG. 12 is a flow diagram conceptually illustrating the creation of a proof that two discrete logarithms are the same, according to one embodiment. At processing block 1202, Trusted Platform Module (TPM) randomly selects value t in the interval [0, B]. TPM may then randomly compute $j=h^t$ mod P and $j_{NAME}=h_{NAME}^t$ mod P at processing block 1204. TPM may then randomly compute r=HASH(h, k, $h_{NAME}$, $k_{NAME}$, j, $j_{NAME}$) at processing block 1206. At processing block 1208, TPM may compute s=Z+t−m*r. Finally, at processing block 1208, TPM may send s, h, k, $h_{NAME}$, $k_{NAME}$, j, $j_{NAME}$ to the challenger. According to one embodiment, the challenger may then verify the proof.

Figure 13:
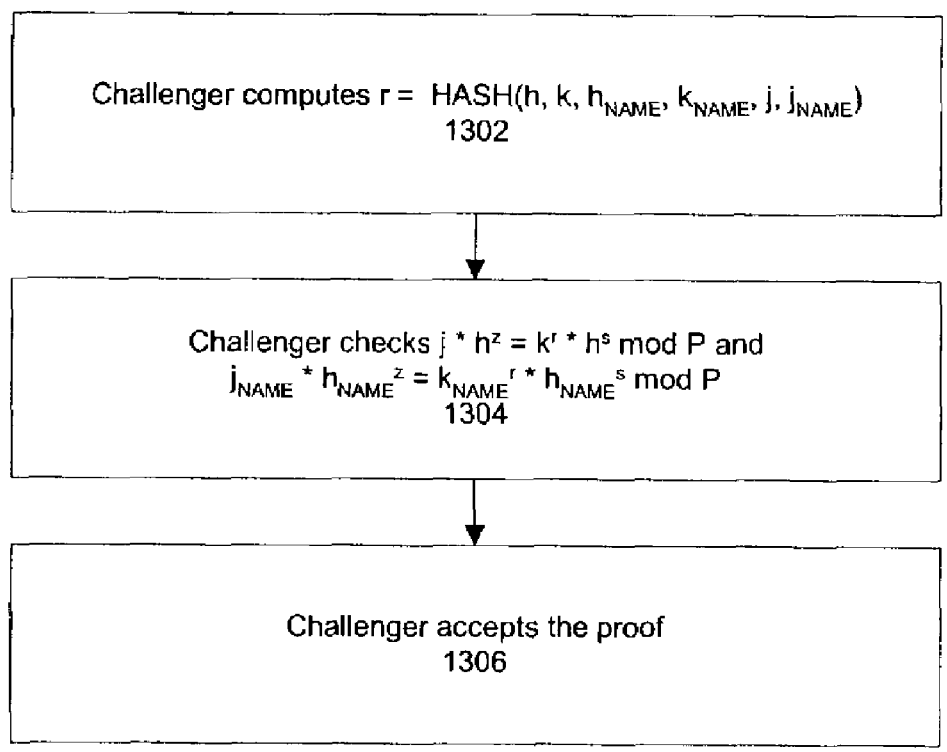
FIG. 13 is a flow diagram conceptually illustrating the verification of a proof that two discrete logarithms are the same, according to one embodiment.

FIG. 13 is a flow diagram conceptually illustrating the verification of a proof that two discrete logarithms are the same, according to one embodiment. At processing block 1302, the challenger may compute r=HASH(h, k, $h_{NAME}$, $k_{NAME}$, j, $j_{NAME}$). The challenger may then check that $j*h=k^{r}*h^{s}$ mod P and $j_{NAME}*h_{NAME}{}^{z}=k_{NAME}{}^{r}*h_{NAME}{}^{s}$ mod P at processing block 1304. If the checks of processing block 1304 pass, the challenger may accept the proof at processing block 1306.

Figure 14:
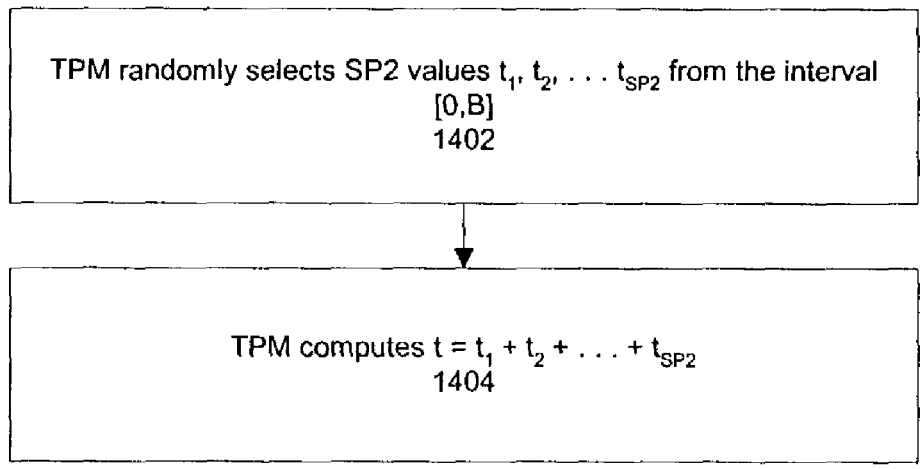
FIG. 14 is a flow diagram conceptually illustrating an alternate method for generating value t, according to one embodiment.

FIG. 14 is a flow diagram conceptually illustrating an alternate method for generating t, according to one embodiment. According to one embodiment, an additional efficiency improvement may be made to the protocol. For example, if the value of t is determined from a uniform distribution from the interval [0,B], the security parameter (SP), such as SP1=60 bits, may be chosen large enough so that the information about m is not revealed. However, an alternative method of choosing t, such as from a non-uniform distribution, may allow for SP, such as SP2=10 bits, to be a much smaller, resulting in improved efficiency.

At processing block 1402, according to one embodiment, a Trusted Platform Module (TPM) may randomly select security parameter (SP2) values $t_1, t_2, \ldots t_{SP2}$ form the interval [0,B]. TPM may then compute $t=t_1+t_2+\ldots+t_{SP2}$ at processing block 1404.

While certain exemplary embodiments of the invention have been described and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software, or a combination thereof.

What is claimed is:

1. A method comprising:
   pre-computing values in a first proof corresponding to a first statement, the values are pre-computed at a first device based on information received from a second device, the first statement having a first key to a target device that the second device is seeking to access, wherein pre-computing includes selecting a parameter, and based on the parameter, verifying trust between the second device and the target device;
   receiving a proof request from the second device;
   verifying validity of the first proof, and generating a second proof based on the values, the second proof corresponding to a second statement, the second statement having a second key to the target device;
   sending the second proof to the second device, the second proof revealing trustworthiness of the target device without revealing identity of the target device; and
   establishing trust between the target device and the second device, the second device to access the target device, wherein the trust is established via a direct proof protocol providing for one or more of constructing the first and second proofs randomly or pseudo-randomly, and constructing the first and second proofs by performing proof computation via the pre-computing values during a pre-computation stage.

2. The method of claim 1, wherein the second proof comprises a proof that the second statement is true if the first statement is true.

3. The method of claim 1, wherein the parameter comprises an assurance parameter.

4. A system comprising:
   a first device coupled with a second device and a target device, the second device seeking to access the target device, the first device to
   pre-compute values in a first proof corresponding to a first statement, the values are pre-computed based on information received from the second device, the first statement having a first key to a target device that the second device is seeking to access, wherein pre-computing includes selecting a parameter, and based on the parameter, verifying trust between the second device and the target device,
   receive a proof request from the second device,
   verify validity of the first proof, and generate a second proof based on the values, the second proof corresponding to a second statement, the second statement having a second key to the target device,
   send the second proof to the second device, the second proof revealing trustworthiness of the target device without revealing identity of the target device, and
   establish trust between the target device and the second device, the second device to access the target device, wherein the trust is established via a direct proof protocol providing for one or more of constructing the first and second proofs randomly or pseudo-randomly, and constructing the first and second proofs by performing proof computation via the pre-computing values during a pre-computation stage.

5. The system of claim 4, wherein the second proof comprises a proof that the second statement is true if the first statement is true.

6. The system of claim 4, wherein the parameter comprises an assurance parameter.

7. A machine-readable medium comprising instructions which, when executed, cause a machine to:
   pre-calculate values in a first proof corresponding to a first statement, the values are pre-computed at a first device based on information received from a second device, the first statement having a first key to a target device that the second device is seeking to access, wherein pre-computing includes selecting a parameter, and based on the parameter, verifying trust between the target device and the second device;
   receive a proof request from the second device;
   verify validity of the first proof, and generate a second proof based on the values, the second proof corresponding to a second statement, the second statement having a second key to the target device;
   send the second proof to the second device, the second proof revealing trustworthiness of the target device without revealing identity of the target device; and
   establish trust between the target device and the second device, the second device to access the target device, wherein the trust is established via a direct proof protocol providing for one or more of constructing the first and second proofs randomly or pseudo-randomly, and constructing the first and second proofs by performing proof computation via the pre-computing values during a pre-computation stage.

8. The machine-readable medium of claim 7, wherein the second proof comprises a proof that a second statement is true if the first statement is true.

9. The machine-readable medium of claim 7, wherein the parameter comprises an assurance parameter.

* * * * *